(12) United States Patent  
Sueyoshi

(10) Patent No.: US 11,765,233 B2  
(45) Date of Patent: Sep. 19, 2023

(54) COMMUNICATION DEVICE, COMMUNICATION SYSTEM, COMMUNICATION METHOD, AND RECORDING MEDIUM

(71) Applicant: Mitsubishi Electric Corporation, Tokyo (JP)

(72) Inventor: Yutaro Sueyoshi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/907,980

(22) PCT Filed: Apr. 24, 2020

(86) PCT No.: PCT/JP2020/017641  
§ 371 (c)(1),  
(2) Date: Aug. 30, 2022

(87) PCT Pub. No.: WO2021/214966  
PCT Pub. Date: Oct. 28, 2021

(65) Prior Publication Data  
US 2023/0105480 A1   Apr. 6, 2023

(51) Int. Cl.  
*H04L 67/12*   (2022.01)

(52) U.S. Cl.  
CPC .................................. *H04L 67/12* (2013.01)

(58) Field of Classification Search  
CPC . H04L 67/12; H04L 12/40143; H04L 12/403; H04L 12/40013; Y02P 90/02  
See application file for complete search history.

(56) References Cited

U.S. PATENT DOCUMENTS 6,212,196 B1 *   4/2001   Momona ............... H04L 12/403  
                                                        370/347  
10,396,894 B2 *   8/2019   Haas .................... H04B 10/691  
(Continued)

FOREIGN PATENT DOCUMENTS

JP            4-192834 A      7/1992  
JP         2002-341907 A     11/2002  
(Continued)

OTHER PUBLICATIONS

International Search Report and Written Opinion dated Jun. 16, 2020, received for PCT Application PCT/JP2020/017641, filed on Apr. 24, 2020, 9 pages including English Translation.

(Continued)

*Primary Examiner* — Abdullahi E Salad  
(74) *Attorney, Agent, or Firm* — XSENSUS LLP

(57) ABSTRACT

A communication device includes a parameter setter and a communication controller for cyclic communication to transmit data including a first data piece and a second data piece different from the first data piece and having lower priority for real-time transmission than the first data piece to slave stations. The parameter setter presets a number of divisions n to divide the second data piece before the cyclic communication is started. The communication controller transmits the first data piece to a first slave station in one cycle, divides the second data piece by the number of divisions n, and transmits the divided second data piece to a second slave station in n cycles, where n is the number of divisions. The communication controller transmits, before transmitting the second data piece, data indicating the number of divisions n set by the parameter setter to the second slave station.

20 Claims, 14 Drawing Sheets

(56) References Cited

U.S. PATENT DOCUMENTS

| | | | |
|---|---|---|---|
| 11,181,893 B2* | 11/2021 | Cella | G05B 23/0297 |
| 2009/0276059 A1* | 11/2009 | Tone | G05B 19/052 |
| | | | 700/86 |
| 2018/0198286 A1* | 7/2018 | Gawthorp | F21V 23/04 |
| 2019/0253356 A1* | 8/2019 | Yoneda | H04L 47/12 |
| 2020/0036786 A1* | 1/2020 | Yoneda | H04L 67/12 |
| 2022/0173837 A1* | 6/2022 | Kainulainen | H04L 1/1829 |

FOREIGN PATENT DOCUMENTS

| | | |
|---|---|---|
| JP | 2003-338843 A | 11/2003 |
| JP | 2012-199816 A | 11/2003 |
| JP | 2018-64245 A | 4/2018 |
| JP | 2019-139630 A | 8/2019 |
| WO | 2007/110953 A1 | 10/2007 |

OTHER PUBLICATIONS

Notice of Reasons for Refusal date Feb. 2, 2021, received for JP Application 2020-562778, 8 pages Including English Translation.

* cited by examiner

FIG. 10

| DATA NO. | SETTING OF COMMUNICATION DESTINATION | | | | REFRESH DEVICE (LEAD) | |
|---|---|---|---|---|---|---|
| | STATION NUMBER | NUMBER OF DIVISIONS | TRANSMISSION SCORE | RECEPTION SCORE | TRANSMISSION | RECEPTION |
| FIRST DATA | 1 | 1 | 128 | 128 | D0 | D200 |
| SECOND DATA | 2 | 4 | 32 | 32 | D356 | D232 |
| THIRD DATA | 3 | 16 | 128 | 128 | D1000 | D2000 |
| FOURTH DATA | 1 | 8 | 128 | 128 | D128 | D328 |
| ... | ... | ... | ... | ... | ... | ... |
| X-TH DATA | X | 32 | 256 | 256 | M0 | M100 |

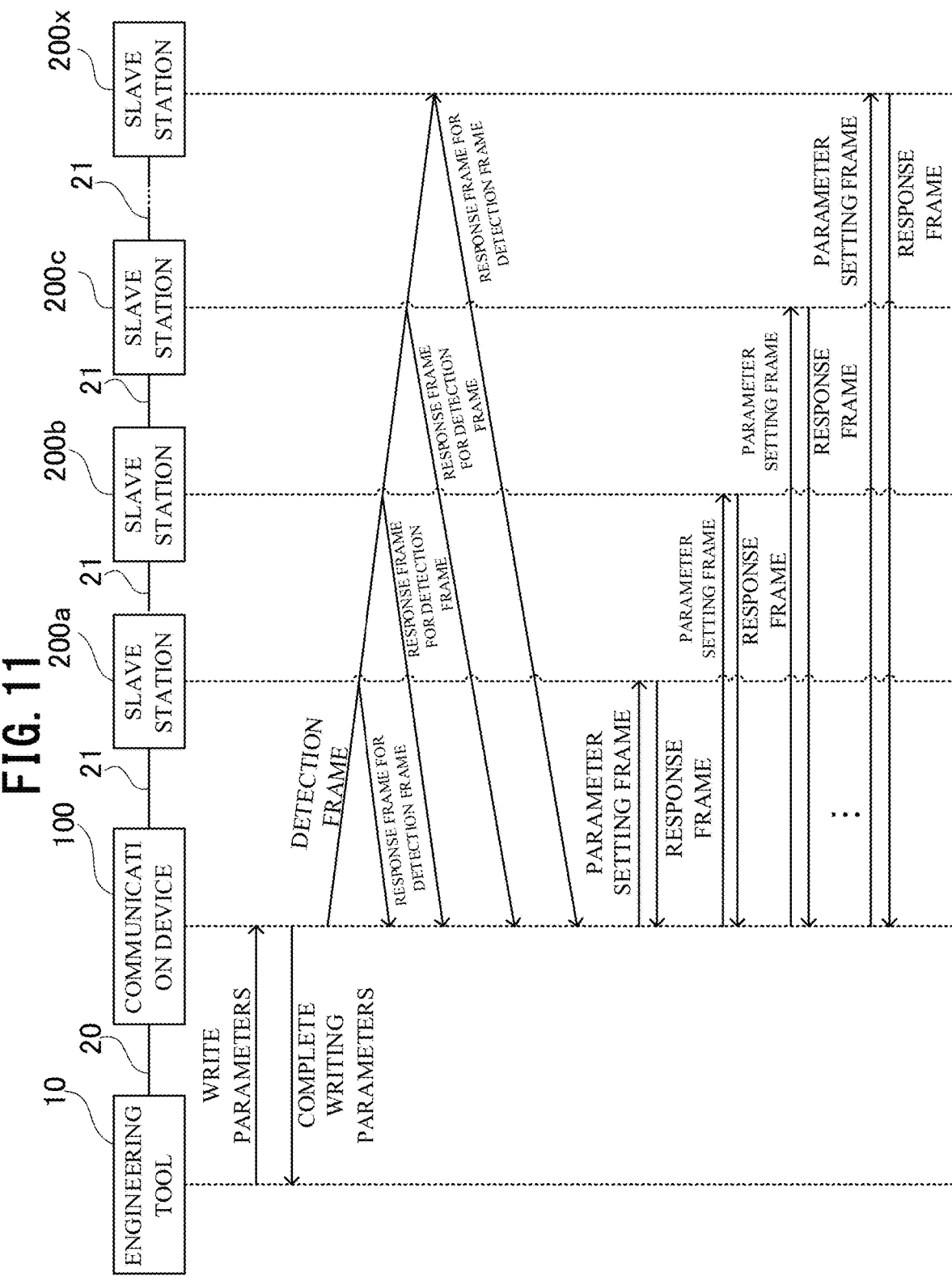

FIG. 12

| | | HEADER | |
|---|---|---|---|
| DATA | DATA SEGMENT 1 TO SLAVE STATION 1 | DESTINATION: STATION NUMBER 1 | |
| | | RECEPTION-AREA STORAGE ADDRESS | |
| | | SEQUENTIAL NUMBER | |
| | | TRANSMISSION SCORE | |
| | | FIRST DATA (CONTROL DATA, UNDIVIDED) | |
| | DATA SEGMENT 2 TO SLAVE STATION 1 | DESTINATION: STATION NUMBER 1 | |
| | | RECEPTION-AREA STORAGE ADDRESS | |
| | | SEQUENTIAL NUMBER | |
| | | TRANSMISSION SCORE | |
| | | FOURTH DATA (MONITORING DATA, DIVIDED) | |
| | DATA SEGMENT TO SLAVE STATION 2 | DESTINATION: STATION NUMBER 2 | |
| | | RECEPTION-AREA STORAGE ADDRESS | |
| | | SEQUENTIAL NUMBER | |
| | | TRANSMISSION SCORE | |
| | | SECOND DATA (DIVIDED) | |
| | DATA SEGMENT TO SLAVE STATION 3 | DESTINATION: STATION NUMBER 3 | |
| | | RECEPTION-AREA STORAGE ADDRESS | |
| | | SEQUENTIAL NUMBER | |
| | | TRANSMISSION SCORE | |
| | | THIRD DATA (DIVIDED) | |
| | | ... | |
| | DATA SEGMENT TO SLAVE STATION X | DESTINATION: STATION NUMBER X | |
| | | RECEPTION-AREA STORAGE ADDRESS | |
| | | SEQUENTIAL NUMBER | |
| | | TRANSMISSION SCORE | |
| | | X-TH DATA (DIVIDED) | |
| | | FOOTER | |

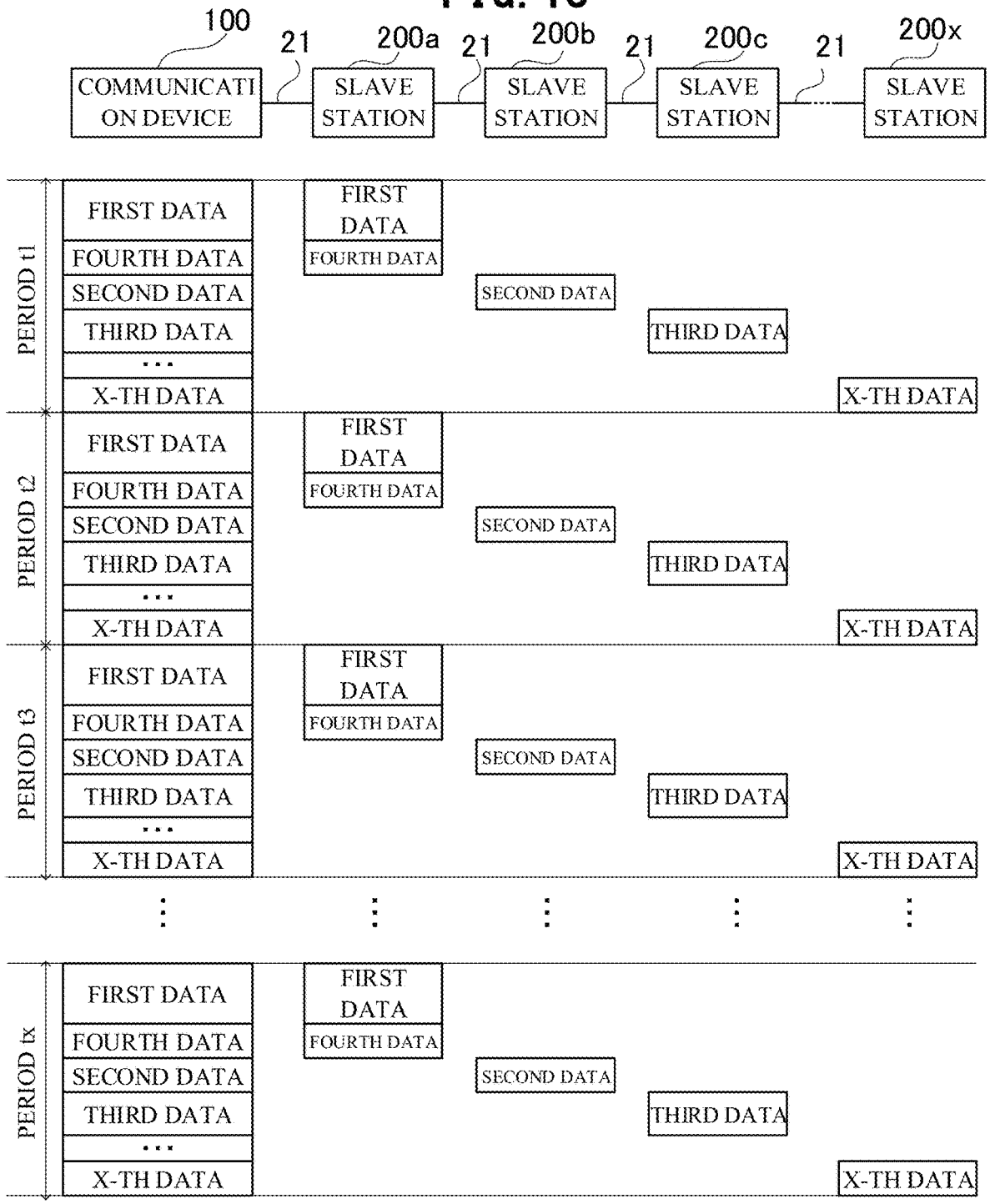

COMMUNICATION DEVICE, COMMUNICATION SYSTEM, COMMUNICATION METHOD, AND RECORDING MEDIUM

CROSS-REFERENCE TO RELATED APPLICATION

The present application is based on PCT filing PCT/JP2020/017641, filed Apr. 24, 2020, the entire contents of which are incorporated herein by reference.

TECHNICAL FIELD

The present disclosure relates to a communication device, a communication system, a communication method, and a program.

BACKGROUND ART

Factory automation (FA) systems use cyclic transmission in real time. As more devices are used in production processes, more devices may be connected and increase the volume of cyclic data. Thus, the system is to transmit a large volume of data in real time. One known method for cyclic transmission divides data based on the maximum size of the data transmitted between a programmable logic controller (PLC) and a communication device, and another known method transmits data pieces in order of priority by constantly comparing the priority levels of transmission data pieces during communication.

Patent Literature 1 describes a communication device including a first control data piece to arrive in a first guarantee time determined by a cyclic period, multiple second control data pieces to arrive in a second guarantee time longer than the cyclic period and including ordered information components, a cyclic communicator that controls communication, and a communication manager that determines the order of communicating the second control data pieces in accordance with the priority levels of the second control data pieces.

CITATION LIST

Patent Literature

Patent Literature 1: Unexamined Japanese Patent Application Publication No. 2019-139630

SUMMARY OF INVENTION

Technical Problem

In Patent Literature 1, although the priority levels of the second control data pieces are compared during communication, second control data pieces successively determined to have high priority may not be transmitted completely within the guarantee time. Additionally, a reception device that receives, from the communication device, transmission data including information including format identification (ID), transaction ID, a total data size, fragment ID, and a fragment data size performs processing based on these pieces of information in each cycle. The processing load thus increases in data reception.

In response to the above issue, an objective of the present disclosure is to provide a communication device, a communication system, a communication method, and a program for efficiently transmitting data pieces with high priority and low priority in real time.

Solution to Problem

To achieve the above objective, a communication device according to an aspect of the present disclosure is a device for cyclic communication to transmit data including a first data piece and a second data piece different from the first data piece to a plurality of slave stations. The second data piece has lower priority for real-time transmission than the first data piece. The communication device includes a parameter setter to preset a number of divisions n to divide the second data piece before the cyclic communication is started, and a communication controller to transmit the first data piece to a first slave station in one cycle, divide the second data piece by the number of divisions n, and transmit the divided second data piece to a second slave station in n cycles, where n is the number of divisions. The communication controller transmits, before transmitting the second data piece, data indicating the number of divisions n set by the parameter setter to the second slave station.

Advantageous Effects of Invention

The communication device according to the above aspect of the present discourse efficiently transmits data pieces with high priority and low priority in real time.

BRIEF DESCRIPTION OF DRAWINGS

FIG. 10 is a table of parameters in the embodiment of the disclosure;

FIG. 11 is a sequence diagram of a parameter setting process in the embodiment of the disclosure;

FIG. 12 is a diagram of communication data transmitted by the communication device in the embodiment of the disclosure;

FIG. 13 is a diagram of communication data transmitted in each period by the communication device in the embodiment of the disclosure.

DESCRIPTION OF EMBODIMENTS

A communication device and a communication system according to an embodiment of the present disclosure are described below with reference to the drawings.

Figure 1:
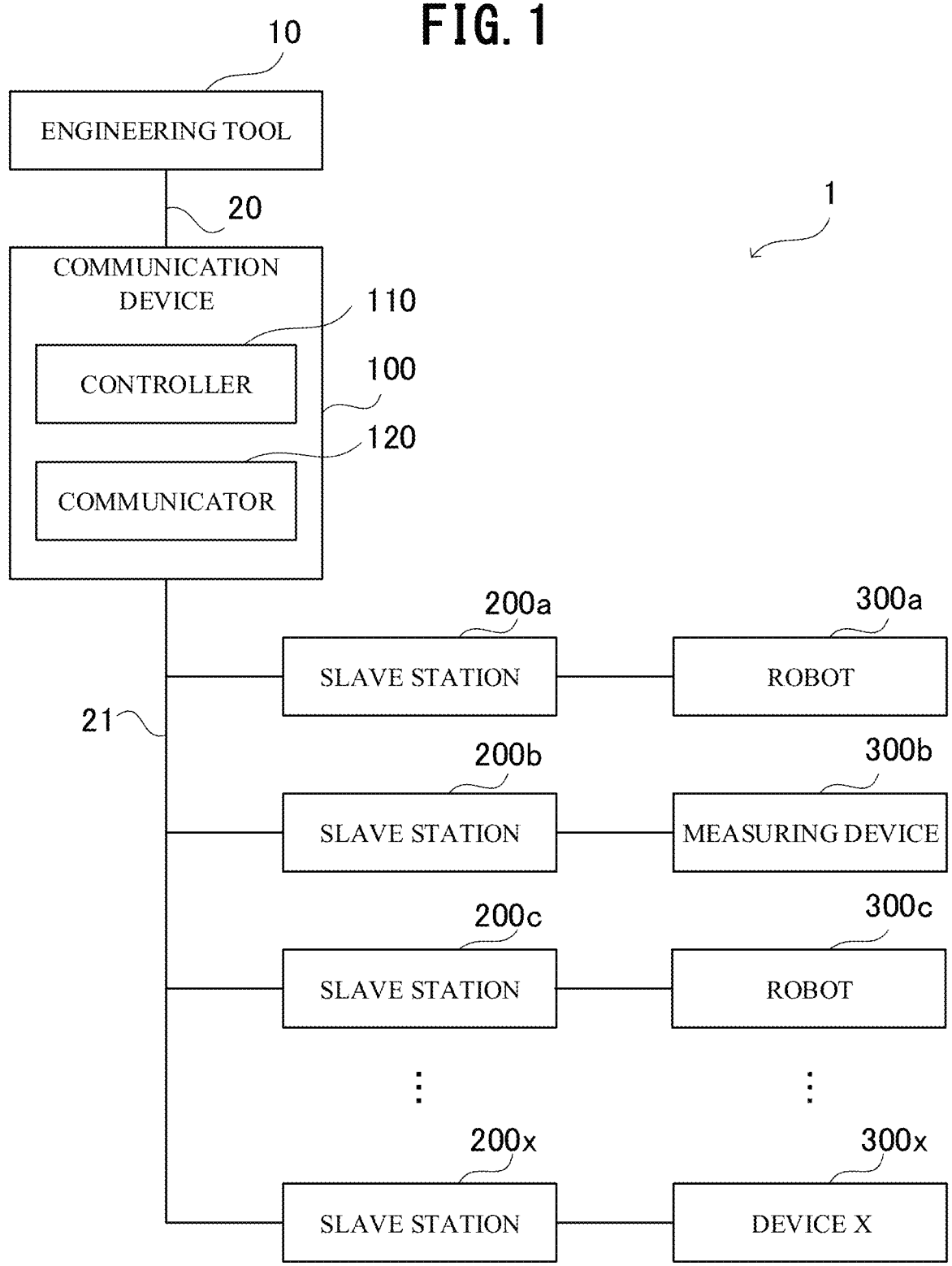
FIG. 1 is a diagram of a communication system according to an embodiment of the disclosure.

As shown in FIG. 1, a communication system 1 according to the present embodiment includes an engineering tool 10 that sets parameters for controlling the communication system 1, a communication device 100 that performs cyclic communication, and slave stations 200a to 200x that receive data transmitted from the communication device 100. A robot 300a, a measuring device 300b, a robot 300c, and a device X 300x are connected to the respective slave stations 200a, 200b, 200c, and 200x, and are controlled based on data transmitted from the respective slave stations 200a, 200b, 200c, and 200x. In the example described below, the communication system 1 is used as a control system for a factory automation (FA) system for controlling the robot 300a, the measuring device 300b, the robot 300c, and the device X 300x.

The engineering tool 10 sets parameters for transmitting data from the communication device 100 to the slave stations 200a to 200x, and transmits data indicating the set parameters to the communication device 100. The parameters include station numbers of the slave stations 200a to 200x, the number of divisions, a transmission score, a reception score, and a transmission address and a reception address of a refresh device. When data is divided, the transmission score indicates the score for transmission in one cycle after division. The engineering tool 10 sets the number of divisions of 1 for a first data piece of the data pieces to be transmitted from the communication device, and the number of divisions of 2 or greater for a second data piece. The first data piece has high priority for real-time transmission, whereas the second data piece has lower priority for real-time transmission than the first data piece. The first and second data pieces may be transmitted to the same one or different ones of the slave stations 200a to 200x.

Figure 2:
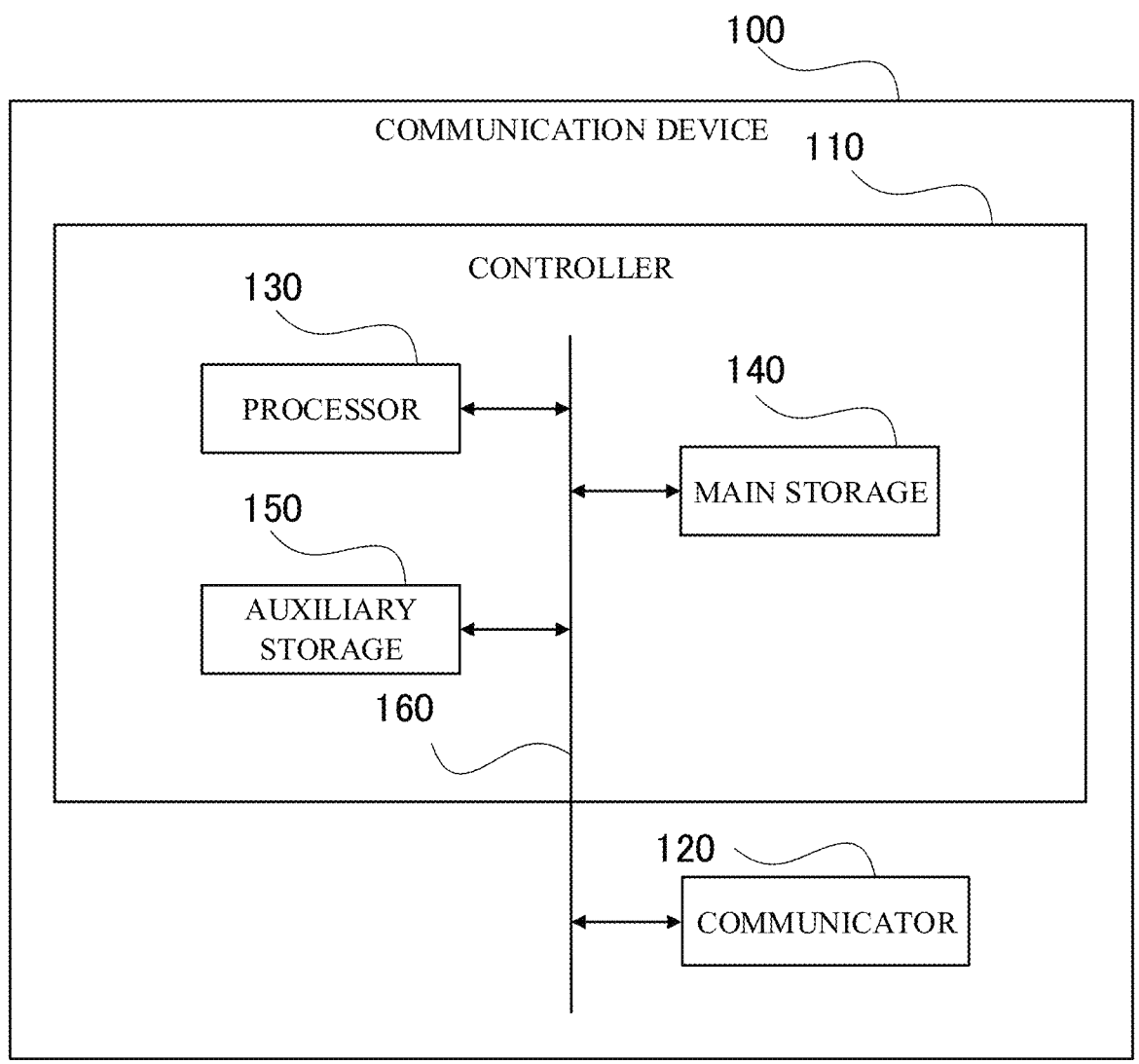
FIG. 2 is a diagram of a communication device according to the embodiment of the disclosure.

The communication device 100 includes a programmable logic controller (PLC) and a central processing unit (CPU). The communication device 100 is connected to the engineering tool 10 with a communication cable 20 to communicate with the engineering tool 10, and receives data indicating the number of divisions of the data transmitted from the engineering tool 10. As shown in FIG. 2, the communication device 100 includes a controller 110 and a communicator 120. The communication device 100 functions as a master station in cyclic communication.

As shown in FIG. 2, the controller 110 includes a processor 130 that performs processing for controlling the communication device 100, a main storage 140 used as a work area for the processor 130, and an auxiliary storage 150 that stores various data items and programs used in the processing performed by the processor 130. The main storage 140 and the auxiliary storage 150 are both connected to the processor 130 with a bus 160.

The processor 130 includes a microprocessing unit (MPU). The processor 130 executes the programs stored in the auxiliary storage 150 to implement various functions of the communication device 100.

The main storage 140 includes a random-access memory (RAM). The programs are loaded from the auxiliary storage 150 into the main storage 140. The main storage 140 is used as a work area for the processor 130, and stores the parameters transmitted from the engineering tool 10 and data to be transmitted to the slave stations 200a to 200x.

The auxiliary storage 150 includes a nonvolatile memory such as an electrically erasable programmable read-only memory (EEPROM). In addition to the programs, the auxiliary storage 150 stores various items of data used for processing performed by the processor 130. As instructed by the processor 130, the auxiliary storage 150 provides data to be used by the processor 130 to the processor 130 and stores data provided from the processor 130.

The communicator 120 includes a network interface circuit to communicate from the engineering tool 10 and the communication device 100 to the slave stations 200a to 200x. The communicator 120 receives signals from the engineering tool 10 and the slave stations 200a to 200x, and outputs data indicated by these signals to the processor 130. The communicator 120 transmits signals indicating the data output from the processor 130 to external devices.

Figure 3:
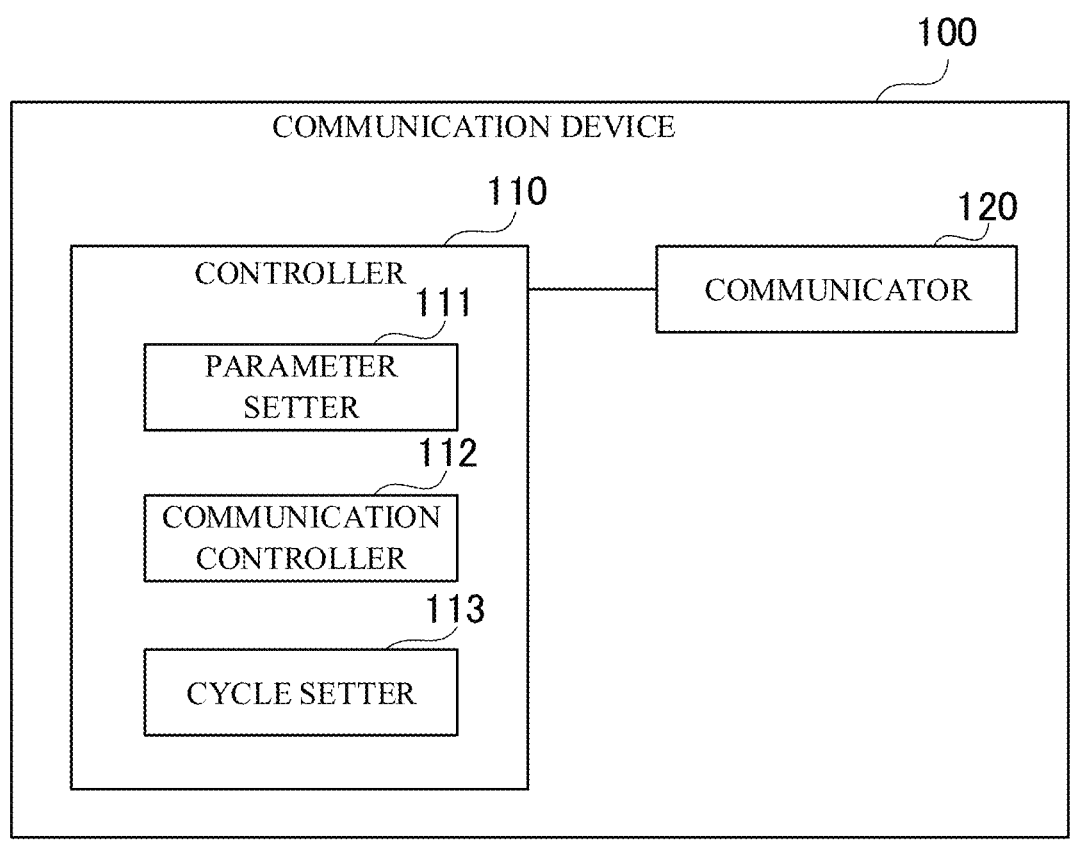
FIG. 3 is a block diagram of the communication device according to the embodiment of the disclosure.

As shown in FIG. 3, the controller 110 executes the programs stored in the auxiliary storage 150 to function as a parameter setter 111, a communication controller 112, and a cycle setter 113.

The parameter setter 111 presets, based on the parameters transmitted from the engineering tool 10, parameters for transmitting data from the communication device 100 to the slave stations 200a to 200x in cyclic communication. The parameter setter 111 then generates detection frames for detecting the slave stations 200a to 200x, and transmits the detection frames to the slave stations 200a to 200x. The parameter setter 111 then receives response frames from the slave stations 200a to 200x. When any of the slave stations 200a to 200x set by the engineering tool 10 does not respond to the detection frame, the parameter setter 111 retransmits the detection frame. When no response is received for the retransmitted detection frame, the parameter setter 111 excludes, from communication targets, the slave station(s) 200a to 200x that have provided no response frame. The parameter setter 111 then transmits parameter setting frames to the slave stations 200a to 200x. The parameters in each parameter setting frame include the number of divisions, the transmission score, the reception score, and the transmission address and the reception address of the refresh device.

The communication controller 112 transmits data to the slave stations 200a to 200x through the communicator 120 in cyclic communication based on the parameters set by the parameter setter 111. The communication controller 112 acquires data to be transmitted to the slave stations 200a to 200x from the engineering tool 10. The communication controller 112 then sets, based on the parameters acquired from the engineering tool 10, the number of divisions for each of data pieces to be transmitted to the slave stations 200a to 200x and divides each data piece by the number of divisions. A data piece divided by one (or the number of divisions is 1) indicates that the data piece is not divided. Thus, the data piece with the number of divisions set to 1 is transmitted without being divided. The communication controller 112 then generates transmission data to be transmitted in one cycle. The transmission data to be transmitted in each cycle includes remaining data segments resulting from the previous division. The transmission data forms a frame for transmission from the communication device 100 in one cycle. The frame stores all the transmission data segments to be transmitted to the slave stations 200a to 200x in one packet. The communication data includes a header, a footer, and data to be transmitted to each of the slave stations 200a to 200x. Each data piece to be transmitted to the slave stations 200a to 200x includes a destination, a reception-area storage address, a sequential number, and the transmission score. The communication controller 112 automatically assigns, as parameters, the sequential number indicating the number of the data segment of the divided data segments, and the reception-area storage address for each of the slave stations 200a to 200x to store receiving data segments. The sequential number is set to 1 for an undivided data piece. The reception-area storage address starts from the leading address of 0 of the reception area. When multiple data pieces are directed to the same one of the slave stations 200a to 200x, the reception-area storage address for the previously-set number is set to a value acquired by adding 1 to the product of the transmission score and the data size of one refresh device. The communication controller 112 then transmits the generated transmission data.

The cycle setter 113 sets a cyclic period based on the volume of transmission data to be transmitted in one cycle. The transmission data to be transmitted in one cycle is generated by the communication controller 112. The cycle setter 113 may change the cyclic period for each cycle. The cycle setter 113 may change the cyclic period based on the volume of transmission data at every reference number of times the cycle is repeated.

Figure 4:
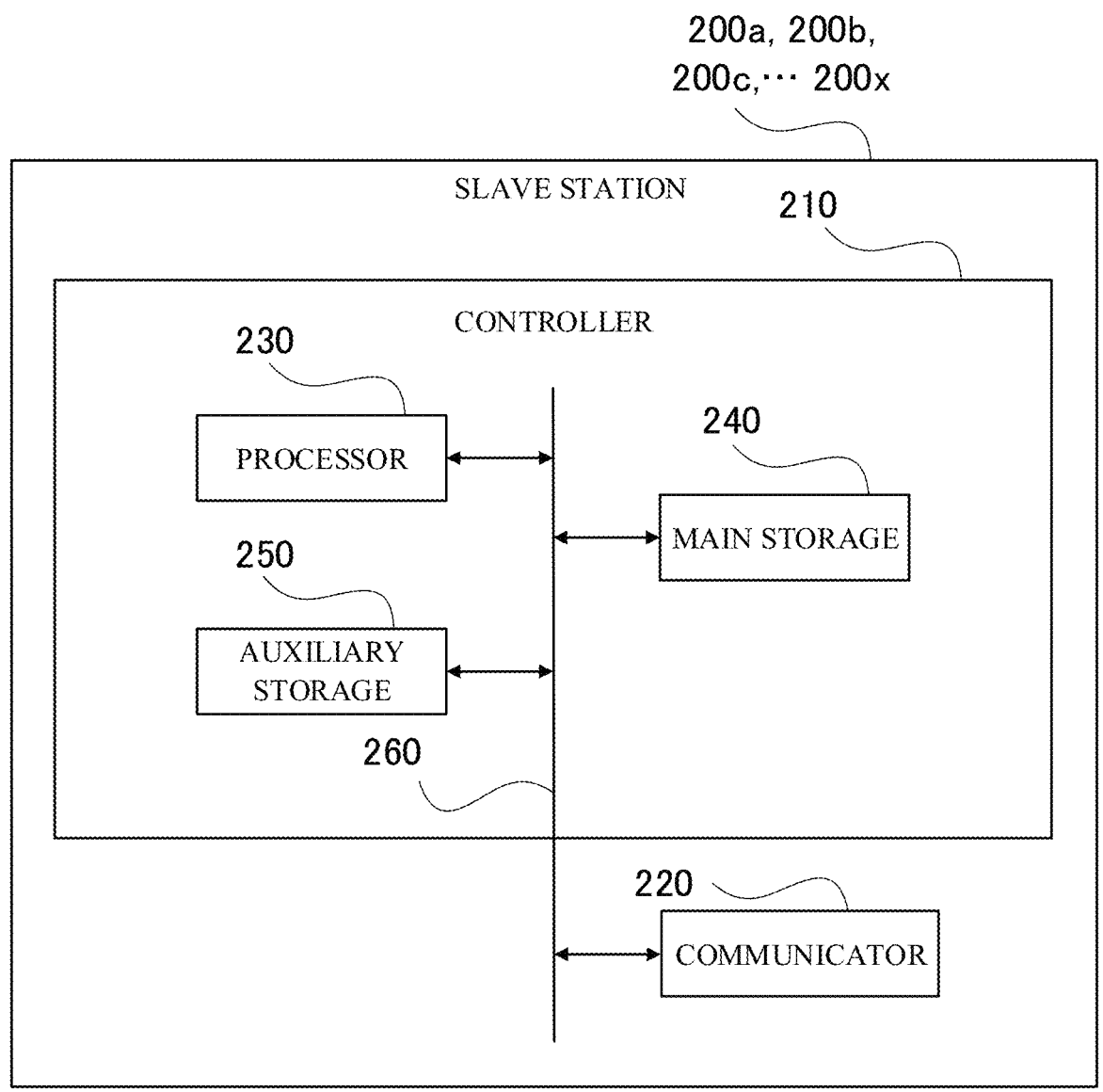
FIG. 4 is a diagram of a slave station in the embodiment of the disclosure.

The slave stations 200a to 200x are connected to the communication device 100 with a communication cable 21 shown in FIG. 1 to communicate with the communication device 100, and receive data transmitted from the communication device 100. The slave station 200a is connected to the robot 300a, the slave station 200b is connected to the measuring device 300b, the slave station 200c is connected to the robot 300c, and the slave station 200x is connected to the device X 300x. The robot 300a, the measuring device 300b, the robot 300c, and the device X 300x are controlled based on data transmitted from the respective slave stations 200a to 200x. As shown in FIG. 4, the slave stations 200a to 200x each include a controller 210 and a communicator 220. The slave stations 200a to 200x store, into the respective robot 300a, measuring device 300b, robot 300c, and device X 300x, data transmitted from the communication device 100 to the address set by the transmission address of the refresh device.

The controller 210 includes a processor 230 that performs processing to control the slave station 200a, 200b, 200c, or 200x, a main storage 240 used as a work area for the processor 230, and an auxiliary storage 250 that stores various data items and programs used for processing performed by the processor 230. The main storage 240 and the auxiliary storage 250 are both connected to the processor 230 with a bus 260.

The processor 230 includes an MPU. The processor 230 executes the programs stored in the auxiliary storage 250 to perform various functions of the slave stations 200a to 200x.

The main storage 240 includes a RAM. The programs are loaded from the auxiliary storage 250 into the main storage 240. The main storage 240 is used as a work area for the processor 230.

The auxiliary storage 250 includes a nonvolatile memory such as an EEPROM. In addition to the programs, the auxiliary storage 250 stores various items of data used for processing performed by the processor 230. As instructed by the processor 230, the auxiliary storage 250 provides data to be used by the processor 230 to the processor 230 and stores data provided from the processor 230.

The communicator 220 includes a network interface circuit for communicating with the communication device 100. The communicator 220 receives a signal from the communication device 100, and outputs data indicated by the signal to the processor 230. The communicator 220 transmits the signal indicating the data output from the processor 230 to an external device.

Figure 5:
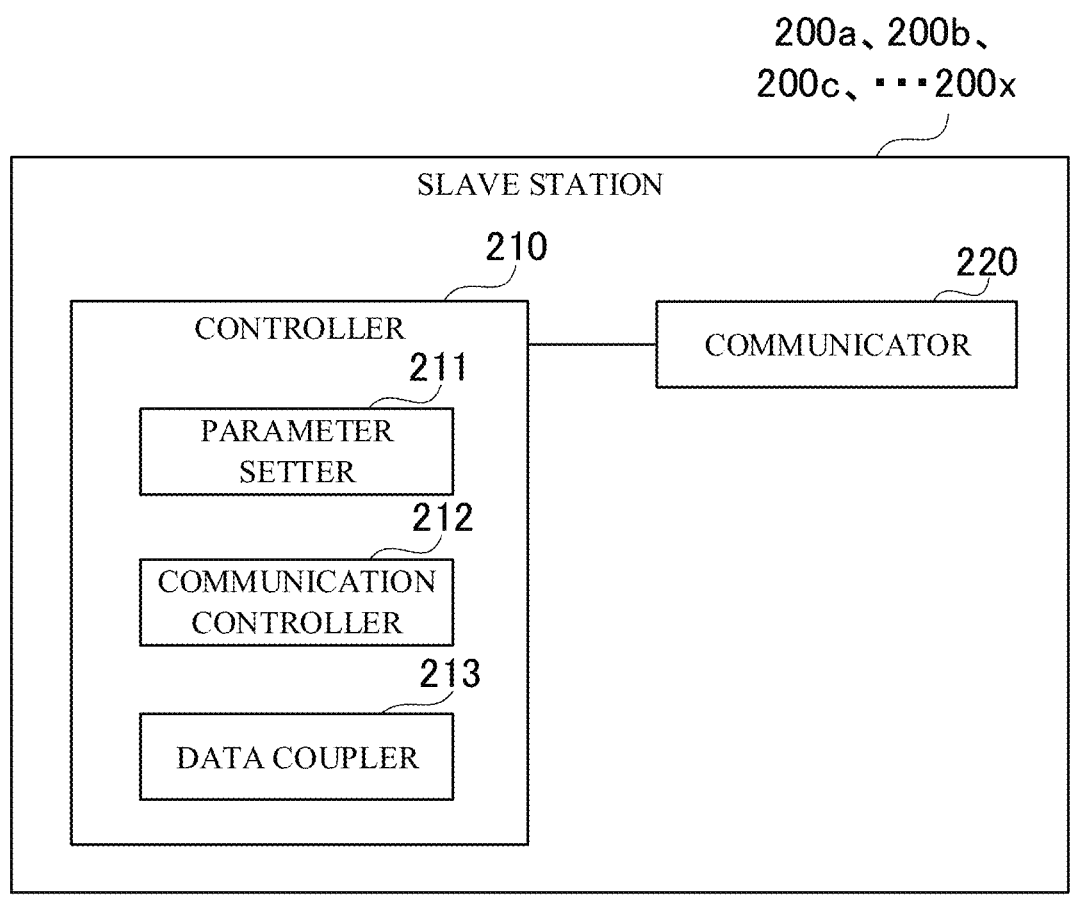
FIG. 5 is a block diagram of the slave station in the embodiment of the disclosure.

As shown in FIG. 5, the controller 210 executes the programs stored in the auxiliary storage 250 to function as a parameter setter 211, a communication controller 212, and a data coupler 213.

The parameter setter 211 sets parameters for receiving data transmitted in cyclic communication. When receiving a detection frame from the communication device 100, the parameter setter 211 transmits a response frame. The parameter setter 211 then receives a parameter setting frame for the station number of the station including the parameter setter 211 from the communication device 100. The parameters included in the parameter setting frame include the number of divisions, the transmission score, the reception score, and the transmission address and the reception address of the refresh device. The parameter setter 211 then transmits a response frame for the parameter setting frame to the communication device 100. The parameter setter 211 then updates reception parameters based on the parameters included in the parameter transmission frame.

The communication controller 212 performs processing to receive data transmitted in cyclic communication. When the destination of the transmission data transmitted from the communication device 100 indicates the station number of the station including the communication controller 212, the communication controller 212 stores the received data into a buffer. The buffer is included in the main storage 240. The communication controller 212 then examines the reception-area storage address, the sequential number, and the transmission score. When determining that the received data is not normal, the communication controller 212 discards the received data stored in the buffer, and transmits data requesting retransmission to the communication device 100. When the communication controller 212 determines that the received data is normal, the communication controller 212 stores the received data in the buffer into a reception-buffer storage address. The reception-buffer storage address is included in the main storage 240. The communication controller 212 then determines whether all the data segments are received. The communication controller 212 determines whether all the data segments are received based on whether the sequential number of the received data segment is the last number of the divided data segments.

When the communication controller 212 determines that all the data segments are received, the data coupler 213 performs refresh. When divided data is transmitted, the data coupler 213 couples segments of the transmission data received in multiple cycles, and performs refresh. When data is transmitted without being divided, the data coupler 213 performs refresh with the data. The data coupler 213 then transmits the coupled data to the robot 300a, the measuring device 300b, the robot 300c, or the device X 300x connected to the corresponding one of the slave stations 200a to 200x.

A transmission process performed by the communication device 100 with the above structure and a reception process performed by the slave stations 200a to 200x are described below.

Figure 6:
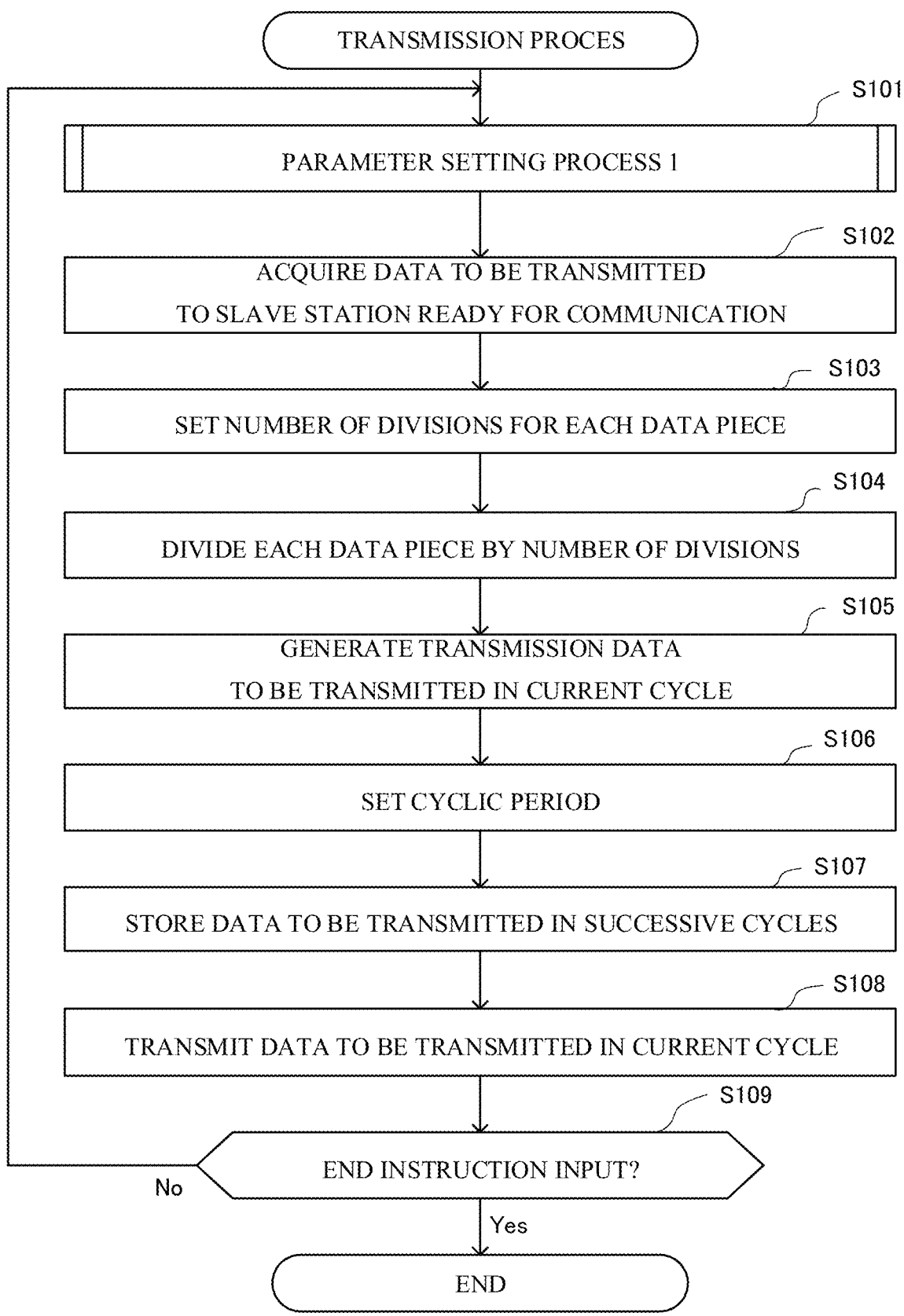
FIG. 6 is a flowchart of a transmission process in the embodiment of the disclosure.
Figure 8:
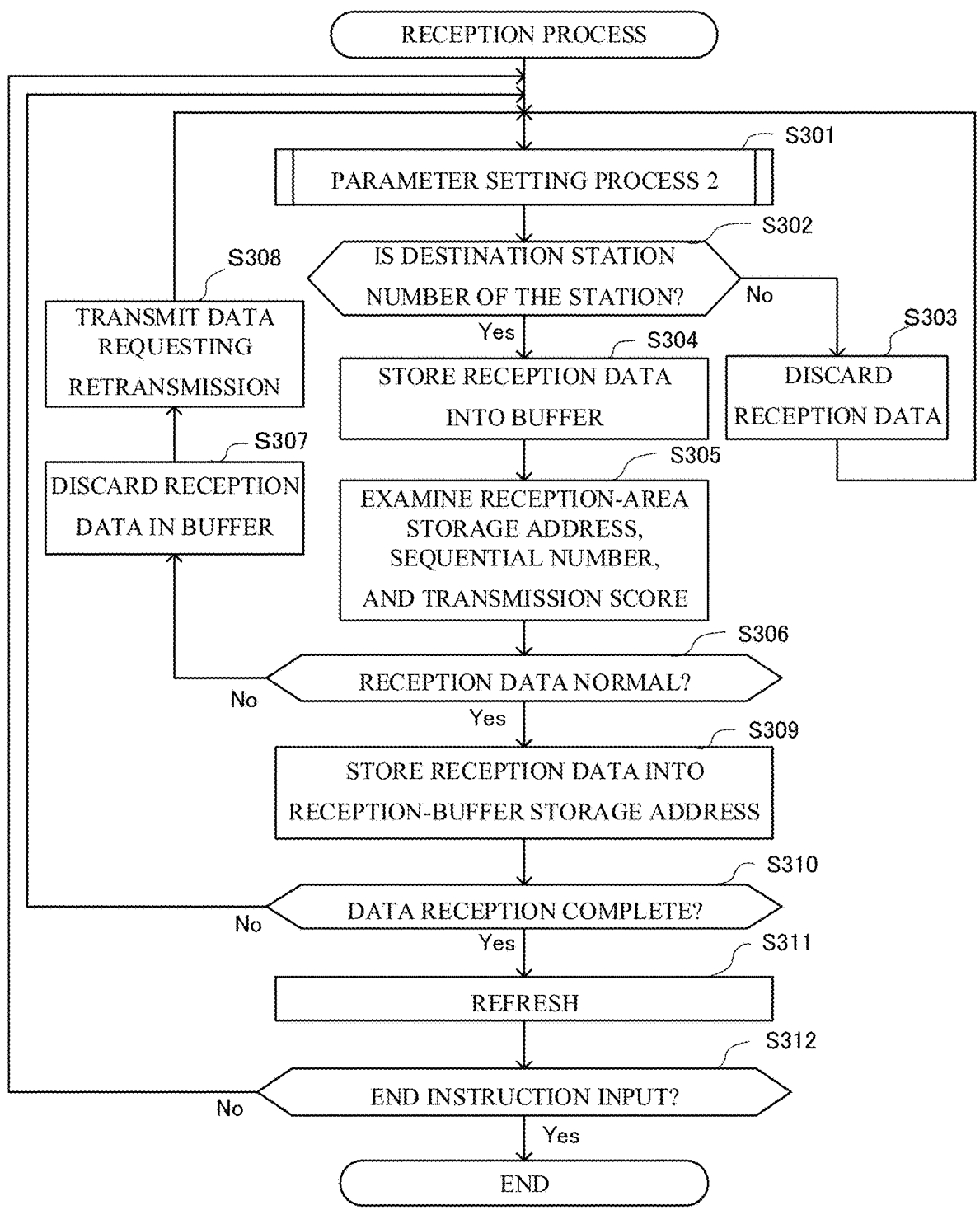
FIG. 8 is a flowchart of a reception process in the embodiment of the disclosure.

In response to an instruction from a user to start the process, the communication device 100 starts the transmission process shown in FIG. 6, and the slave stations 200a to 200x start the reception process shown in FIG. 8. The transmission process performed by the communication device 100 and the reception process performed by the slave stations 200a to 200x are described below with reference to the flowcharts.

Upon start of the transmission process, the parameter setter 111 starts a parameter setting process for setting parameters for cyclic communication (step S101).

Figure 7:
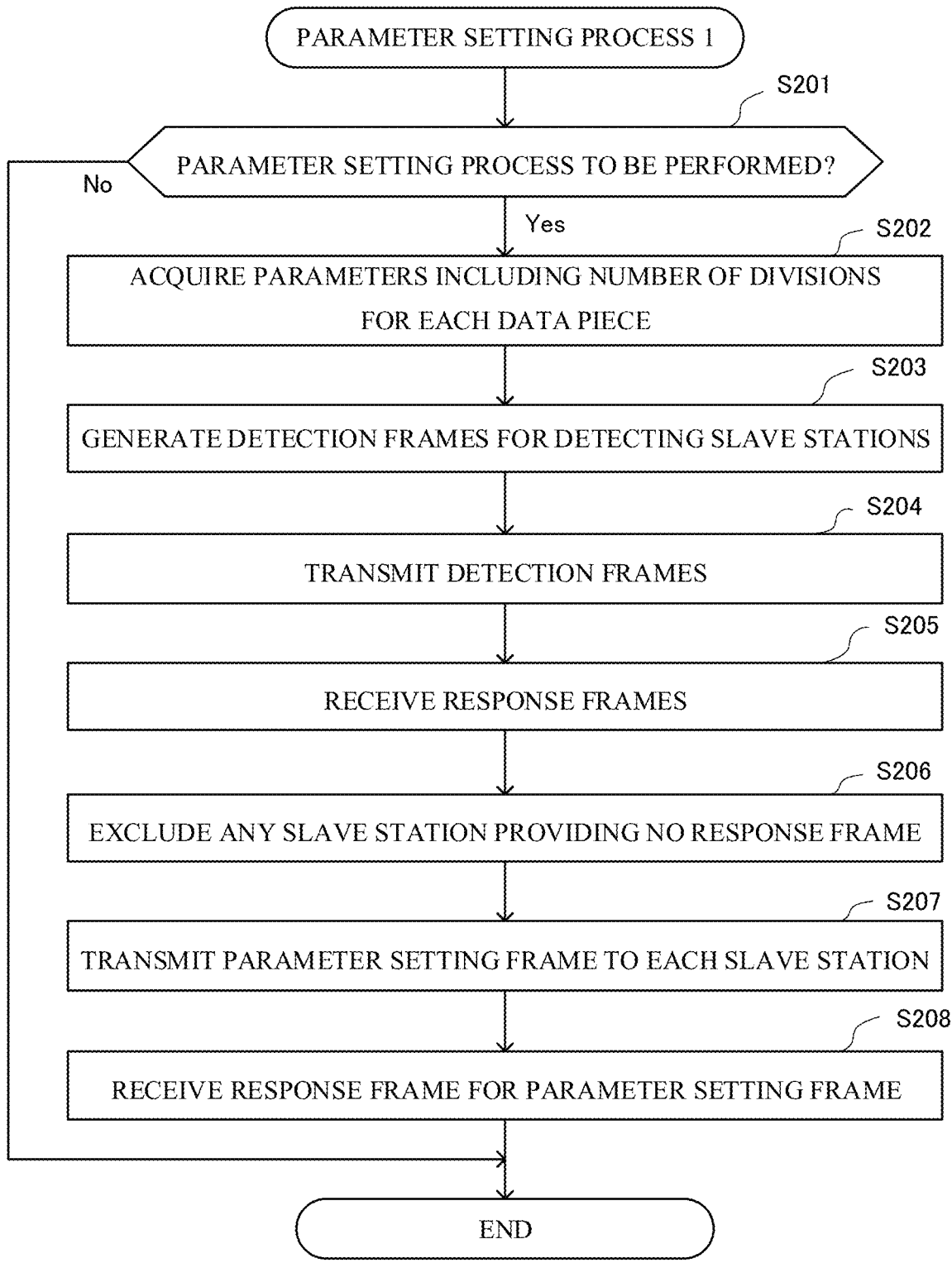
FIG. 7 is a flowchart of parameter setting process 1 in the embodiment of the disclosure.

At the start of the parameter setting process shown in FIG. 7, the parameter setter 111 determines whether the parameter setting process is to be performed (step S201). When the parameter setter 111 determines that the parameters have been set and are usable without any change (No in step S201), the parameter setting process is ended, and the processing returns to the transmission process in FIG. 6.

When the parameter setter 111 determines that the parameter setting process is to be performed (Yes in step S201), the parameter setter 111 acquires parameters including the number of divisions for dividing the transmission data pieces from the engineering tool 10 (step S202). The acquired parameters include the communication destination station number, the number of divisions, the transmission score, the reception score, and the transmission address and the reception address of the refresh device. The parameter setter 111 then generates detection frames for detecting the slave stations 200a to 200x (step S203). Subsequently, the parameter setter 111 transmits the detection frames to the slave stations 200a to 200x (step S204). The parameter setter 111 then receives response frames from the slave stations 200a to 200x (step S205). When any of the slave stations 200a to 200x set by the engineering tool 10 does not respond to the detection frame, the parameter setter 111 retransmits the detection frame. When no response is received for the retransmitted detection frame, the parameter setter 111 excludes, from communication targets, the slave station(s) 200a to 200x that have provided no response frame (step S206).

The parameter setter 111 transmits parameter setting frames to the slave stations 200a to 200x (step S207). The parameter setter 111 then receives the response frames for the parameter setting frames from the slave stations 200a to 200x (step S208). When any of the slave stations 200a to 200x does not respond to the parameter setting frame, the parameter setter 111 retransmits the response frame for the parameter setting frame until receiving any response. The parameter setting process is then ended, and the processing returns to the transmission process shown in FIG. 6.

In the transmission process, the communication controller 112 acquires, based on the parameters from the engineering tool 10, data to be transmitted to a slave station(s) ready for communication from the data acquired from the CPU through refresh (step S102). Subsequently, the communication controller 112 sets the number of divisions for each of data pieces to be transmitted to the slave stations 200a to 200x based on the parameters acquired from the engineering tool 10 (step S103). Subsequently, the communication controller 112 divides each data piece by the number of divisions (step S104). For a data piece with the number of divisions of 1, the communication controller 112 does not divide the data piece. Subsequently, the communication controller 112 generates the transmission data to be transmitted in the current cycle (step S105). The transmission data to be transmitted in the current cycle includes remaining data segments resulting from the previous division. The cycle setter 113 then sets a cyclic period based on the volume of transmission data to be transmitted in one cycle (step S106). The communication controller 112 stores the remaining ones of the divided data segments into the main storage 140 (step S107). The communication controller 112 then transmits data to be transmitted in the current cycle (step S108).

Subsequently, the communication controller 112 determines whether an end instruction is input (step S109). When the communication controller 112 determines that an end instruction has yet to be input (No in step S109), the processing returns to step S101, and steps S101 to S109 are repeated. Thus, the communication controller 112 can transmit the divided data segments in multiple cycles. When the communication controller 112 determines that the end instruction is input (Yes in step S109), the transmission process is ended.

When the slave stations 200a to 200x start the reception process, the slave stations 200a to 200x start a parameter setting process for setting parameters for cyclic communication (step S301).

Figure 9:
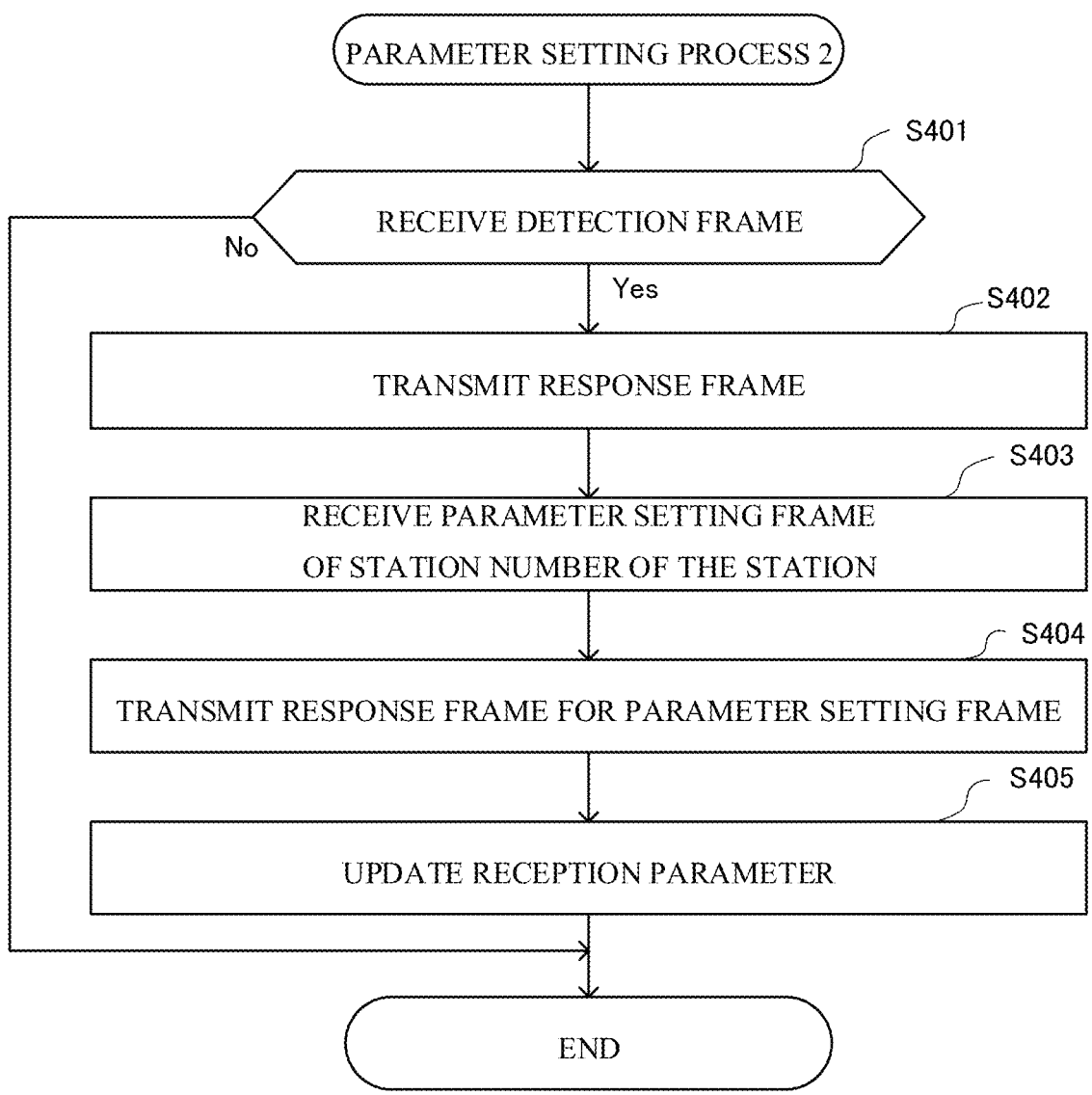
FIG. 9 is a flowchart of parameter setting process 2 in the embodiment of the disclosure.

When the parameter setting process shown in FIG. 9 is started, the parameter setter 211 determines whether the slave station has received the detection frame from the communication device 100 (step S401). When the parameter setter 211 determines that the detection frame has yet to be transmitted (No in step S401), the parameter setting process is ended, and the processing returns to the reception process shown in FIG. 8.

When the parameter setter 211 determines that the slave station has received the detection frame (Yes in step S401), the parameter setter 211 transmits a response frame (step S402). Subsequently, the parameter setter 211 receives a parameter setting frame for the station number of the station including the parameter setter 211 from the communication device 100 (step S403). The parameters included in the parameter setting frame include the number of divisions, the transmission score, the reception score, and the transmission address and the reception address of the refresh device. Subsequently, the parameter setter 211 transmits the response frame for the parameter setting frame to the communication device 100 (step S404). Subsequently, the parameter setter 211 updates the reception parameters based on the parameters included in the parameter transmission frame (step S405). The parameter setting process is then ended, and the processing returns to the reception process shown in FIG. 8.

In the reception process, the communication controller 212 determines whether the destination of the transmission data transmitted from the communication device 100 is the station number of the station including the communication controller 212 (step S302). When the communication controller 212 determines that the destination of the received transmission data is not the station number of the station including the communication controller 212 (No in step S302), the communication controller 212 discards the received data (step S303). The processing then returns to step S301, and steps S301 to S303 are repeated.

When the communication controller 212 determines that the destination of the received transmission data is the station number of the station including the communication controller 212 (Yes in step S302), the communication controller 212 stores the received data into the buffer (step S304). The buffer is included in the main storage 240. Subsequently, the communication controller 212 examines the reception-area storage address, the sequential number, and the transmission score (step S305). The communication controller 212 then determines whether the received data is normal (step S306). When determining that the received data is not normal (No in step S306), the communication controller 212 discards the received data stored in the buffer (step S307), and transmits data requesting retransmission to the communication device 100. (step S308). The processing then returns to step S301, and steps S301 to S308 are repeated.

When determining that the received data is normal (Yes in step S306), the communication controller 212 stores the received data in the buffer into the reception-buffer storage address (step S309). The reception-buffer storage address is included in the main storage 240. Subsequently, the communication controller 212 determines whether all the data segments have been received (step S310). The determination as to whether all the data segments have been received is performed based on whether the sequential number of the received data segment is the last number of the divided data segments. When the communication controller 212 determines that not all the data segments have been received (No in step S310), the processing returns to step S301, and steps S301 to S310 are repeated. When the communication controller 212 determines that all the data segments have been received (Yes in step S310), the data coupler 213 performs refresh (step S311). When divided data is transmitted, the data coupler 213 couples the segments of the transmission data received in multiple cycles, and performs refresh. When data is transmitted without being divided, the data coupler 213 performs refresh with the data. The data coupler 213 then transmits the coupled data to the robot 300a, the measuring device 300b, the robot 300c, or the device X 300x connected to the corresponding one of the slave stations 200a to 200x.

The communication controller 212 then determines whether an end instruction is input (step S312). When the communication controller 212 determines that an end instruction has yet to be input (No in step S312), the processing returns to step S301, and steps S301 to S312 are repeated. Thus, the data divided and transmitted in multiple cycles can be received. When the communication controller 212 determines that an end instruction is input (Yes in step S312), the transmission process is ended.

In the example described below, the engineering tool 10 sets the parameters shown in FIG. 10. The transmission process performed by the communication device 100 and the reception process performed by the slave stations 200a to 200x are described. A first data piece has high priority for real-time transmission, with the number of divisions set to 1. The first data piece is transmitted without being divided. A second data piece has lower priority for real-time transmission than the first data piece, with the number of divisions n set to 4. A third data piece has lower priority for real-time transmission than the second data piece, with the number of divisions m set to 16 that is greater than the number of divisions n set for the second data piece. A fourth data piece is transmitted to the same slave station 200a as the slave station 200a to which the first data piece is transmitted. The fourth data piece has lower priority for real-time transmission than the first data piece, with the number of divisions p set to 8. The number of divisions n and the number of divisions p are natural numbers greater than 2, and the number of divisions m is a natural number greater than the number of divisions n. An X-th data piece has lower priority for real-time transmission than the third data piece. The second to fourth data pieces and the X-th data piece are divided by the respective numbers of divisions for transmission.

As shown in FIG. 11, the parameter setter 111 in the communication device 100 acquires, from the engineering tool 10, parameters including the number of divisions to divide each data piece for transmission (step S202 in FIG. 7). The parameter setter 111 acquires parameters shown in FIG. 10. Subsequently, the parameter setter 111 generates detection frames for detecting the slave stations 200a to 200x (step S203 in FIG. 7). The parameter setter 111 then transmits detection frames to the slave stations 200a to 200x (step S204 in FIG. 7). When the parameter setter 211 in each of the slave stations 200a to 200x determines that the detection frame is received (Yes in step S401 in FIG. 9), the parameter setter 211 transmits the response frame (step S402 in FIG. 9). The parameter setter 111 in the communication device 100 then receives the response frames from the slave stations 200a to 200x (step S205 in FIG. 7).

The parameter setter 111 in the communication device 100 then transmits the parameter setting frames to the slave stations 200a to 200x (step S207 in FIG. 7). The parameter setter 211 in each of the slave stations 200a to 200x receives the parameter setting frame for the station number of the slave station from the communication device 100 (step S403 in FIG. 9). The parameter setter 211 then transmits the response frame for the parameter setting frame to the communication device 100 (step S404 in FIG. 9). The parameter setter 211 then updates the reception parameters based on the parameters included in the parameter transmission frame (step S405 in FIG. 9). The parameter setter 111 in the communication device 100 then receives the response frames for the parameter setting frames from the slave stations 200a to 200x (step S208 in FIG. 7).

The communication controller 112 then acquires, based on the parameters from the engineering tool 10, data to be transmitted to any of the slave stations 200a to 200x ready for communication from the data acquired from the CPU through refresh (step S102 in FIG. 6). The communication controller 112 then sets the number of divisions for each data piece to be transmitted to the slave stations 200a to 200x based on the parameters acquired from the engineering tool 10 (step S103 in FIG. 6). The communication controller 112 then divides each data piece by the number of divisions (step S104 in FIG. 6). The number of divisions for the first data piece is set to 1, and thus the communication controller 112 does not divide the first data piece. The communication controller 112 then generates transmission data shown in FIG. 12 to be transmitted in the current cycle (step S105 in FIG. 6). The communication data forms a frame for transmission from the communication device 100 in one cycle. The frame stores all the transmission data segments to be transmitted to the slave stations 200a to 200x in one packet. The communication data includes a header, a footer, and data to be transmitted to the slave stations 200a to 200x. Each of the data segments to be transmitted to the slave stations 200a to 200x includes the destination, the reception-area storage address, the sequential number, the transmission score, and the first, second, third, fourth, or X-th data piece. The sequential number is set to 1 for an undivided data piece. The communication controller 112 automatically assigns, as parameters, the sequential number indicating the number of data segment of the divided data segments, and the reception-area storage address for each of the slave stations 200a to 200x to store receiving data segments. The sequential number is set to 1 for an undivided data piece.

Each data piece is divided by the number of divisions shown in FIG. 10. A data segment 1 directed to a slave station 1 includes the first data piece with the number of divisions of 1. The first data piece is thus not divided. The first data piece is a control data piece in this example. A data segment 2 directed to the slave station 1 includes the fourth data piece with the number of divisions p of 8. Thus, the data segment 2 is one of the eight segments of the fourth data piece. The fourth data piece is a monitoring data piece in this example. A data segment directed to a slave station 2 includes the second data piece with the number of divisions n of 4. Thus, this data segment is one of the four segments of the second data piece. A data segment directed to a slave station 3 includes the third data piece with the number of divisions m of 16. Thus, this data segment is one of the 16 segments of the third data piece. A data segment directed to a slave station X includes the X-th data piece with the number of divisions of 32. Thus, this data segment is one of the 32 segments of the X-th data piece.

The cycle setter 113 then sets the cyclic period based on the volume of the transmission data transmitted in one cycle (step S106 in FIG. 6). In this example, the cycle setter 113 sets the period to allow transmission of the transmission data shown in FIG. 12. The communication controller 112 stores remaining data segments of the divided data segments into the main storage 140 (step S107 in FIG. 6). Subsequently, data to be transmitted in the current cycle is transmitted (step S108 in FIG. 6).

When the communication controller 212 in each of the slave stations 200a to 200x determines that the received data is normal (Yes in step S306 in FIG. 8), the communication controller 212 stores the received data in the buffer into the reception-buffer storage address (step S309 in FIG. 8). The reception-buffer storage address is included in the main storage 240. Subsequently, the communication controller 212 determines whether all the data segments are received (step S310 in FIG. 8). For the first data piece that is not divided, the determination as to whether all the data segments are received indicates whether the first data piece is received. For the second data piece that is divided, the determination as to whether all the data segments are received indicates whether all the divided data segments of the second data piece are received. When the communication controller 212 determines that all the data segments are received (Yes in step S310 in FIG. 8), the data coupler 213 performs refresh (step S311 in FIG. 8). As described above, the communication device 100 performs the communication process, and the slave stations 200a to 200x perform the reception process. As shown in FIG. 13, the data volume transmitted in one cycle can be reduced by dividing the data pieces with low priority for real-time transmission, thus shortening the periods t1 to tx.

The communication device 100 with the above structure can determine, with the engineering tool 10, the number of divisions for data to be transmitted to each of the slave stations 200a to 200x. The communication device 100 determines the number of divisions of 1, indicating no division, for the data piece with high priority for real-time transmission and determines the number of divisions of 2 or greater for the data piece with low priority for real-time transmission. This structure allows a user to appropriately set the number of divisions for cyclic data, the transmission score, and the reception score as parameters for transmission from the mater to the slaves, thus shortening the communication period and completing the communication within arrival guarantee time in a system that operates in multiple periods in combination. This structure can also shorten the cyclic period by setting the cyclic period based on the volume of transmission data to be transmitted in one cycle. The parameter setting is pre-performed to divide the data pieces with low priority for real-time transmission or to divide data pieces directed to the slave stations 200a to 200x before transmission or reception of the data pieces. This allows a relatively small volume of data transmitted in one cycle and thus shortens the cyclic period. Additionally, a constant volume of data is transmitted in one cycle, and thus the communication can be completed within the arrival guarantee time of the cyclic communication.

Figure 14:
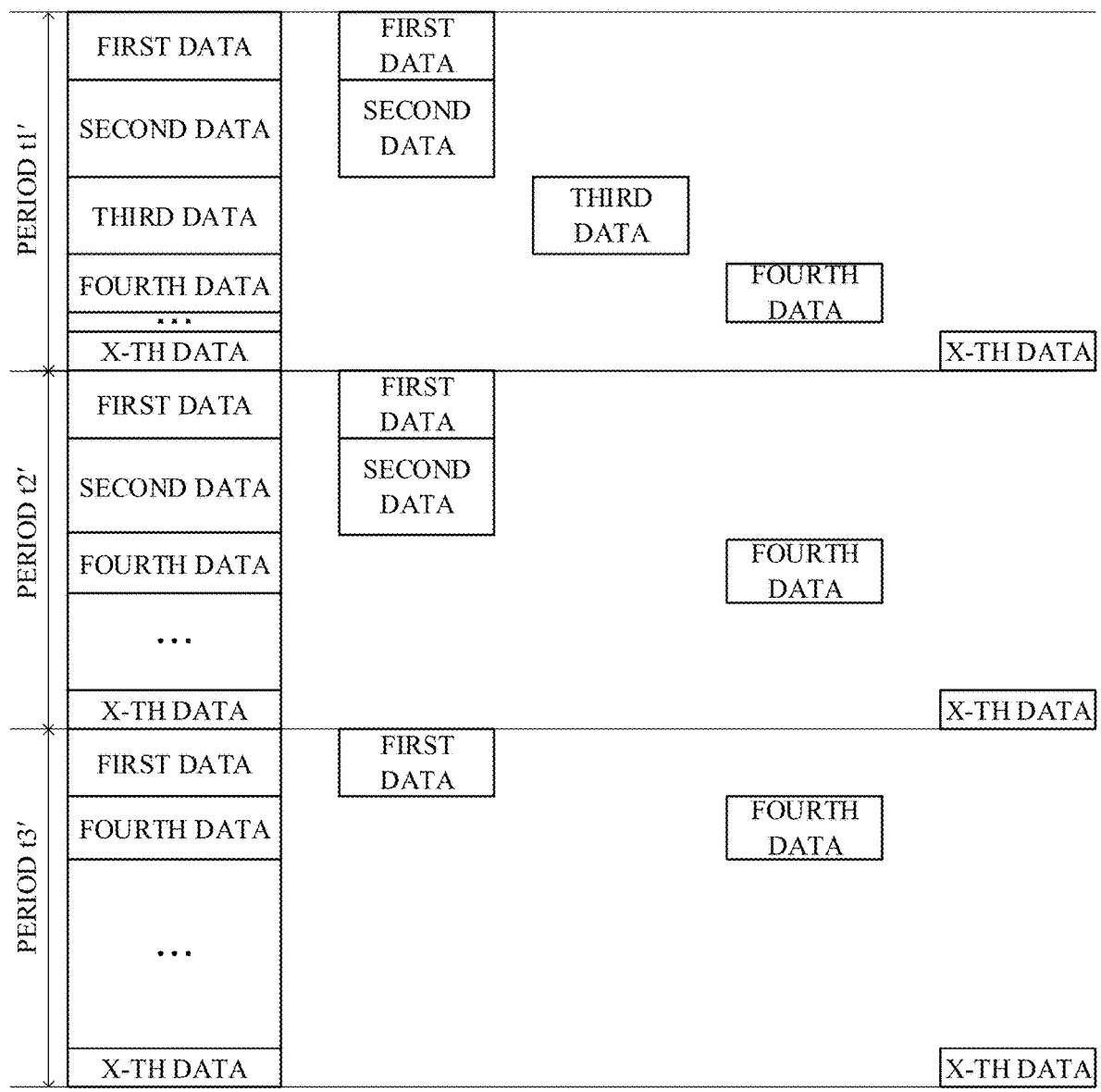
FIG. 14 is a diagram of communication data transmitted in each period by a communication device in a comparative example.

In contrast, a device in a comparative example has a preset cyclic period, divides a data piece not fully transmitted in one cycle, and transmits the remaining segments of the data piece in the subsequent cycle. As shown in FIG. 14, first to fourth and X-th data pieces are transmitted in a period t1'. The first data piece is transmitted in every period. The second to fourth and X-th data pieces are divided for transmission when each data piece is not fully transmitted in one cycle. In a period t2', the first data piece to be transmitted in every period, and segments of the second, fourth, and X-th data pieces not transmitted in the period t1' are transmitted. In a period t3', the first data piece to be transmitted in every period, and segments of the fourth and X-th data pieces not transmitted in the periods t1' and t2' are transmitted. This structure does not shorten the periods t1' to 3' and may not transmit data efficiently. When a large volume of data pieces is transmitted at the same time, some of the data pieces may be transmitted in a delayed manner.

Modifications

In the above embodiment, data to be transmitted from the communication device 100 to the slave stations 200a to 200x is divided. In some embodiments, data to be transmitted from the slave stations 200a to 200x to the communication device 100 may be divided for the communication device 100 and the slave stations 200a to 200x to efficiently transmit data pieces with high priority and low priority in real time. In this case, the communication device 100 transmits parameters including the number of divisions, the reception score, and the sequential number to each of the slave stations 200a to 200x. The slave stations 200a to 200x divide, based on the parameters including the number of divisions, the reception score, and the sequential number, data to be transmitted to the communication device 100 from slave stations 200a to 200x and transmit the divided data to the communication device 100. The data to be transmitted in this case is the same as the transmission data shown in FIG. 12, and stored for transmission in an area with the destination set to the station number of the slave station. The communication device 100 receives the divided data segments in the same manner as the slave stations 200a to 200x.

In the above embodiment, the communication system 1 is used as a control system for an FA system, but the communication system 1 may be any system that controls a device in cyclic communication. The communication system 1 may be used as a control system that controls elevators or platform screen doors.

In the above embodiment, the controller 110 in the communication device 100 includes the single processor 130. In some embodiments, multiple processors 130 may together perform the above function in coordination. The controller 110 may include multiple main storages 140 and multiple auxiliary storages 150. The above hardware configuration including the slave stations 200a to 200x is a mere example, and may be changed or modified as appropriate.

The communication system 1, the communication device 100, and the slave stations 200a to 200x are implementable with a common computer system, rather than with a dedicated system. For example, a computer program for performing the above operations may be stored in a non-transitory computer-readable recording medium (a flexible disk, a compact disc read-only memory or CD-ROM, or a digital versatile disc read-only memory or DVD-ROM) for distribution, and installed into the computer to implement the communication system 1 that performs the above processing. The computer program may be stored in a storage device included in a server device on a communication network and downloaded to a common computer system to implement the communication system 1, the communication device 100, and the slave stations 200a to 200x.

In the system with the functions of the communication system 1, the communication device 100, and the slave stations 200a to 200x implementable by the operating system (OS) and an application program in a shared manner or through cooperation between the OS and the application program, portions executable by the application program may be stored in a non-transitory recording medium or a storage.

The computer program may be superimposed on a carrier wave to be distributed through a communication network. For example, the computer program may be posted on a bulletin board system (BBS) on a communication network to be distributed through the communication network. The above process may be performed by activating the computer program and executing the program in the same manner as in the other application programs under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Communication system
10 Engineering tool
20, 21 Communication cable
100 Communication device
110, 210 Controller
111, 211 Parameter setter
112, 212 Communication controller
113 Cycle setter
120, 220 Communicator
130, 230 Processor
140, 240 Main storage
150, 250 Auxiliary storage
160, 260 Bus
200a to 200x Slave station
213 Data coupler
300a, 300c Robot
300b Measuring device
300x Device X

The invention claimed is:

1. A communication device for cyclic communication to transmit data including a first data piece and a second data piece different from the first data piece to a plurality of slave stations including a first slave station and a second slave station, the second data piece having lower priority for real-time transmission than the first data piece, the communication device comprising:
parameter setting circuitry to preset a number of divisions n to divide the second data piece before the cyclic communication is started; and
communication controlling circuitry to transmit the first data piece to the first slave station in one cycle after transmitting data indicating the number of divisions n preset by the parameter setting circuitry to the second slave station, divide the second data piece by the number of divisions n preset by the parameter setting circuitry, and transmit the divided second data piece to the second slave station in a plurality of cycles.

2. The communication device according to claim 1, wherein
the data includes the first data piece, the second data piece, and a third data piece with lower priority for real-time transmission than the second data piece, and
the parameter setting circuitry sets a number of divisions m for the third data piece, the number of divisions m being greater than the number of divisions n for the second data piece.

3. The communication device according to claim 2, wherein
the data includes the first data piece and a fourth data piece that is different from the first data piece and to be transmitted to the first slave station,
the parameter setting circuitry sets a number of divisions p for the fourth data piece, and
the communication controlling circuitry transmits the first data piece to the first slave station in the cycle without dividing the first data piece, divides the fourth data piece by the number of divisions p, and transmits the divided fourth data piece in p cycles, where p is the number of divisions.

4. The communication device according to claim 2, further comprising:
cycle setting circuitry to set a period of the cycle based on a volume of data to be transmitted in the cycle.

5. The communication device according to claim 2, wherein
the communication controlling circuitry receives divided data transmitted from each of the plurality of slave stations, and couples segments of the divided data received in a plurality of the cycles upon receiving all of the segments of the divided data.

6. The communication device according to claim 2, wherein
the parameter setting circuitry presets, based on parameters received from an engineering tool and including the number of divisions n, the number of divisions n for transmitting data by the cyclic communication.

7. The communication device according to claim 2, wherein
the parameter setting circuitry presets, based on parameters set by a user and including the number of divisions n, the number of divisions n for transmitting data by the cyclic communication.

8. The communication device according to claim 2, wherein
the parameter setting circuitry sets the number of divisions for dividing the first data piece to 1, and
the communication controlling circuit transmits, to the first slave station, data indicating that the number of divisions set by the parameter setting circuitry is 1, and then transmits the first data piece to the first slave station in one cycle.

9. The communication device according to claim 1, further comprising:
cycle setting circuitry to set a period of the cycle based on a volume of data to be transmitted in the cycle.

10. The communication device according to claim 1, wherein
the communication controlling circuitry receives divided data transmitted from each of the plurality of slave stations, and couples segments of the divided data received in a plurality of the cycles upon receiving all of the segments of the divided data.

11. A communication system, comprising:
the communication device according to claim 1; and
a plurality of slave stations to receive the data transmitted from the communication device.

12. The communication device according to claim 1, wherein
the data includes the first data piece and a fourth data piece that is different from the first data piece and to be transmitted to the first slave station,
the parameter setting circuitry sets a number of divisions p for the fourth data piece, and
the communication controlling circuitry transmits the first data piece to the first slave station in the cycle without dividing the first data piece, divides the fourth data piece by the number of divisions p, and transmits the divided fourth data piece in p cycles, where p is the number of divisions.

13. The communication system according to claim 11, wherein
the communication controlling circuitry in the communication device transmits, before transmitting the second data piece, data indicating the number of divisions n set by the parameter setting circuitry to the second slave station, and
after receiving the data indicating the number of divisions n, the second slave station performs refresh upon receiving all segments of the divided second data piece.

14. The communication system according to claim 11, wherein
each of the plurality of slave stations divides data to be transmitted from the slave station to the communication device, and transmits a plurality of segments of the divided data in a plurality of cycles, and
the communication controlling circuitry in the communication device receives the plurality of segments of the divided data transmitted from the slave station, and couples the plurality of segments of the received data upon receiving all of the plurality of segments of the divided data.

15. The communication system according to claim 11, wherein
each of the plurality of slave stations presets a reception-area storage address based on parameters received from the communication device including the number of divisions n, the reception-area storage address, a transmission score, and a reception score, receives segments of divided data in a plurality of the cycles, and performs refresh upon receiving all the segments of the divided data.

16. The communication device according to claim 1, wherein
the parameter setting circuitry presets, based on parameters received from an engineering tool and including the number of divisions n, the number of divisions n for transmitting data by the cyclic communication.

17. The communication device according to claim 1, wherein
the parameter setting circuitry presets, based on parameters set by a user and including the number of divisions n, the number of divisions n for transmitting data by the cyclic communication.

18. The communication device according to claim 1, wherein
the parameter setting circuitry sets the number of divisions for dividing the first data piece to 1, and
the communication controlling circuit transmits, to the first slave station, data indicating that the number of divisions set by the parameter setting circuitry is 1, and then transmits the first data piece to the first slave station in one cycle.

19. A communication method for cyclic communication to transmit data including a first data piece and a second data piece different from the first data piece to a plurality of slave stations including a first slave station and a second slave station, the second data piece having lower priority for real-time transmission than the first data piece, the method comprising:
a parameter setting step of presetting a number of divisions n to divide the second data piece before the cyclic communication is started; and
a communication control step of transmitting the first data piece to the first slave station in one cycle after transmitting data indicating the number of divisions n set in the parameter setting step to the second slave station, dividing the second data piece by the number of divisions n preset in the parameter setting step, and transmitting the divided second data piece to the second slave station in a plurality of cycles.

20. A non-transitory computer-readable recording medium storing a program, the program causing a computer to control a communication device for cyclic communication to transmit data including a first data piece and a second data piece different from the first data piece to a plurality of slave stations including a first slave station and a second slave station, the second data piece having lower priority for real-time transmission than the first data piece, the program causing the computer to function as
parameter setting circuitry to preset a number of divisions n to divide the second data piece before the cyclic communication is started, and
communication controlling circuitry to transmit the first data piece to the first slave station in one cycle after transmitting data indicating the number of divisions n preset by the parameter setting circuitry to the second slave station divide the second data piece by the number of divisions n preset by the parameter setting circuitry, and transmit the divided second data piece to the second slave station in a plurality of cycles.

* * * * *